United States Patent Office 2,748,101
Patented May 29, 1956

2,748,101

WATER-SOLUBLE PHENOL-FORMALDEHYDE CONDENSATION PRODUCTS

Harold M. Shappell, Bound Brook, N. J., assignor to Union Carbide and Carbon Corporation, a corporation of New York No Drawing. Application December 24, 1952,
Serial No. 327,913

5 Claims. (Cl. 260—60)

This invention relates to water-soluble, heat-hardenable, alkaline-catalyzed, condensation products of phenol and formaldehyde and is more particularly concerned with improved products of this type and their production which on aging under conditions of normal shipping and storage temperatures retain to a much greater extent than heretofore a high solubility in water.

This application is a continuation-in-part of my pending application Serial No. 276,440, filed March 13, 1952.

Water - soluble, phenol - formaldehyde condensation products are conventionally prepared by reacting phenol with at least an equi-molar amount of formaldehyde under alkaline conditions and at moderate temperatures, from room temperature to about 100° C. Upon the formation of a water-soluble condensation product which is largely a mixture of various methylol phenols, the product is generally partly dehydrated to yield low viscosity liquids having a solids content ranging from about 60 to 80%, but under special conditions such as by spray drying, a substantially dry, water-soluble highly viscous material can be obtained. The major reason for partially or completely dehydrating these condensation products is to hold down the cost of shipping the products from the manufacturer to the consumer.

Depending on the reaction conditions, the freshly finished condensation product may have a finite or infinite miscibility with water. In many applications of this type of phenolic condensation product, it is highly essential that the product be capable of dilution with water to form clear homogeneous single-phase mixture of as low as 5% concentration of the dehydrated product. Such diluted aqueous solutions are commonly used by consumers to spray or otherwise coat glass fibers for bonding such fibers into coherent batts or the like upon heat-hardening of the condensation product.

There is presently no particular problem in producing a phenol-formaldehyde condensation product having an initial water-miscibility such that it can be diluted with water to 5% or less content of the product. But this initially high water-miscibility property is ordinarily not retained by the product for more than a week at storage temperatures of 25° C. Holding the product at lower storage temperatures, for example 0°–10° C. tends to slow down the rate at which the products decrease in water-miscibility. While storage and shipping of these products under refrigeration is possible, the extra costs are an economic burden that is often not commensurate for the slight increase in permissible storage time before use.

It has been recognized that complete or partial neutralization of the alkaline catalyst in the water-soluble condensation product favorably improves the aging properties. This is taught by Meharg in U. S. Patent No. 2,190,672, who recommends adjusting the pH value of water-soluble, phenol-formaldehyde condensation products with organic or mineral acids, such as oxalic acid, phosphoric acid and the like to a pH range between 6.5 and 8.5, but preferably 7.5 to 7.6 for maximum stability of the water-miscibility property. Nevertheless this improvement is inadequate for present-day requirements, emphasizing high-water miscibility even after several weeks aging. Tests have demonstrated that water-soluble, phenol-formaldehyde condensation products prepared with an initial water-miscibility even in excess of 2500 percent and which were neutralized to pH values of 7.5 to 7.6 with oxalic acid, phosphoric acid or hydrochloric acid upon aging at 25° C. storage temperatures decreased to 1000% water miscibility in only six days.

It has now been found that by neutralizing an alkaline catalyzed water-soluble, liquid condensation product of phenol and formaldehyde with boric acid in amount to impart a pH value between 7.0 and 8.0, improved products are obtained which can be stored at a temperature of 25° C. for as long as 28 days and even more in some instances before their water miscibility decreased, for example, from 2500 per cent to 1000 per cent. This discovery was considered most unexpected since heretofore it had been reported by Balz in U. S. Patent No. 2,235,193 that the addition of boric acid directly to an aqueous alkaline solution of a phenol-formaldehyde quickly caused precipitation of the product in the form of a water-insoluble, friable solid.

The water-soluble, phenol-formaldehyde condensation products which can be treated with boric acid according to the present invention include all phenol-formaldehyde condensation products in which between 1.1 and 3.0 mols of formaldehyde have combined with a molar quantity of phenol under alkaline conditions, more particularly at a reaction pH between 8.4 and 11.5 and with the reaction terminated at a stage yielding a homogeneous, liquid reaction product which may contain water of condensation and such water as may be present from using formalin as the source of formaldehyde, which product when adjusted with water to a non-volatile content of 68% (as determined by heating a sample for two hours at 149° C.) is completely miscible with at least 10 volumes of distilled water per volume of the adjusted solids product.

Water miscibility is determined as follows. To a 250 ml. graduate add 20 ml. of the material to be tested and which has been adjusted to a temperature of 25° C. Add distilled water in increments of 20 ml. and at a temperature of 25° C. Mix well after each addition of water and observe the clarity of the mixture. Continue the addition of the distilled water until a clouding or turbidity of the mixture appears and which does not disappear on thorough mixing. The number of such 20 ml. additions, made before the appearance of the persistent cloud or turbidity, times 100, is the per cent miscibility of the material.

As alkaline catalysts suitable for the condensation reaction of phenol with formaldehyde are catalysts such as sodium hydroxide, potassium hydroxide and the like which do not form water-insoluble borate salts or complexes upon the addition of the boric acid. Barium hydroxide and calcium hydroxide are unsatisfactory catalysts, in that they yield insoluble products with boric acid.

Because of the high yield of infusible resin solids obtained upon heat-conversion at high baking temperatures, 230° C. and higher, the water-soluble, phenol-formaldehyde condensation products described in my copending application, Serial No. 276,440, filed March 13, 1952, are a preferred type for modification with boric acid. These products are prepared by reacting phenol with at least 2.5 mols of formaldehyde at a reaction pH between 8.4 and 11.5 in the presence of an alkaline catalyst such as sodium hydroxide until at least 2.25 mols and up to three mols of formaldehyde have reacted per mol of phenol to yield a water-soluble condensation product, which, on a purified basis, by which is meant a product freed of catalyst, unreacted phenol and unreacted formaldehyde, has an average molecular weight between 225 and 300 as determined by the Menzies-Wright boiling point method.

The boric acid in amount to impart the desired pH between 7.0 and 8.0 can be added before, during, or after the step of partially or completely dehydrating the phenol-formaldehyde condensation product. To facilitate dispersal of the boric acid in the condensation product, a slurry of about 1 part by weight of boric acid in two to three parts water has been found to be convenient. The boric acid-water slurry is readily dispersed in the phenol-formaldehyde condensation product, yielding a homogeneous solution after mixing for about 30 minutes with conventional stirring or agitating equipment. The phenol-formaldehyde condensation is preferably at a temperature between 30° C. and 50° C. when the boric acid is incorporated.

Specific embodiments of the invention hereinafter given further illustrate the invention.

Example I

A still suitable for the manufacture of phenol-aldehyde condensation products and having an agitator, reflux and distillation columns, and steam jacketing was charged (all parts being by weight) with 100 parts synthetic phenol, 287 parts formalin (37% formaldehyde) and 10 parts sodium hydroxide, as catalyst. The pH of the reaction mixture was 9.5. Steam was supplied to the still's jacket to raise the temperature of the reaction mixture to about 40–45° C. and was then shut off upon the reaction mixture beginning to react exothermically. The temperature of the reaction mixture was permitted to rise to 70° C. and then held there by means of vacuum refluxing for 1.25 hours. 11.5 parts boric acid in 38 parts of water were then added and 1.3 parts sodium hydroxide to secure a pH between 7.3 and 7.8. The resultant product was an amber colored liquid having a viscosity of 18–20 centistokes at 25° C.; a water-miscibility of 1500 per cent; and a specific gravity of 1.1700–1.1750 at 25° C.

The non-volatile or solids content was 39.6 per cent (as determined by baking a sample for two hours at 149° C.). Analytical data, based on the charged molar ratio of one mol phenol and 3.329 mols formaldehyde indicated that 2.923 mols formaldehyde had reacted per mol of phenol to form methylol and methylene groups. 84 percent of the potential resin solids as determined by baking a sample at 149° C. were realized in the form of useful resinous binder when the liquid resin was baked on glass fibers at the higher baking temperatures of 230° to 290° C. The product at a 25° C. storage temperature dropped in miscibility with distilled water from an original value of 1100 per cent to 500 per cent in forty days as compared with ten days for the same condensation products modified with hydrochloric acid to the same pH value.

Example II

A still was charged with 100 parts phenol, 287 parts of formalin (37% formaldehyde) and 25 parts of a 25% solution of sodium hydroxide in water. The contents of the still were heated to 40° C. and external heating then discontinued because an exothermic reaction occurred, raising the temperature to about 70° C. The reaction mixture was held at 70° C. for one hour and 15 minutes, control of temperature being secured by means of vacuum refluxing. The reaction mass was then dehydrated by vacuum distillation at a temperature not over 45° C. until 135 parts of distillate, consisting principally of water and unreacted formaldehyde had been collected. There was then added to the still 8.75 parts of boric acid in the form of a slurry with 17.50 parts water. Vacuum dehydration was again initiated at a temperature not over 50° C. until 30 parts of distillate had been obtained. The product in the still was a clear amber colored liquid having a pH value of 7.7, a water-miscibility value of 3,500 per cent, a specific gravity of 1.27 at 25° C. and a solids content of 62% as determined by baking a sample for two hours at 149° C., a viscosity between 400 and 500 centistokes and an unreacted formaldehyde content between 8 and 10%. After aging the material for sixty days at 25° C., the water-miscibility had decreased to 500 percent. A sample of the same product stored at 0° C. had a water-miscibility over 2000 per cent after 140 days storage.

When other acids were substituted for the boric acid in the manufacture of the condensation product described in Example II, for example, hydrochloric acid, sulfur dioxide, sulfuric acid, sulfamic acid, phosphoric acid in amount to impart a pH of 7.6, the resultant products when aged at 25° C. decreased in water-miscibility from an original value of over 2500 per cent to less than 1000 per cent in less than 7 days, whereas the boric acid-modified resin of Example II did not decrease to the 1000 per cent level until after 28 days aging at 25° C.

Example III

A water-soluble condensation product having a lower amount of combined formaldehyde per mol of phenol and within the molar proportion range taught by the Meharg Patent No. 2,190,672 was prepared by charging a resin still with 100 parts phenol (1.06 mols), 195 parts formalin 37% formaldehyde content (2.4 mols) and 13.64 parts of a 25% aqueous solution of sodium hydroxide. The reaction was initiated as described in Example I, and then held for 2.25 hours at 70° C. Thereafter, 125 parts of distillate principally water and unreacted formaldehyde were removed from the reaction mass by vacuum distillation. Analysis of the reaction product at this stage indicated that 1.53 mols of formaldehyde had combined per mol of phenol. A slurry consisting of 4.48 parts of boric acid and 16.09 parts water were added to the product and mixed therewith for about 30 minutes or until solution occurred. The resultant product was a clear amber-colored liquid, having a miscibility over 3500 per cent, a pH value of 7.96 and a non-volatile content of 63.9% as determined by baking a sample for two hours at 149° C. This product upon storage at 25° C. for 12 days decreased in water-miscibility to 1500 per cent.

In comparison the same reaction product as described in Example III, but being modified instead with 8.04 parts of 32% strength hydrochloric acid dissolved in 16.09 parts water yielded a product having a pH value of 7.34, a non-volatile content of 62.0 per cent and also an initial water-miscibility over 3500 per cent. This product, however, decreased much more rapidly in water-miscibility, namely to 450 per cent after being stored at 25° C. for 12 days.

It has previously been noted herein that water-miscible liquid phenolic resins are commonly used at organic resin solids contents as low as 5% of the diluted mix weight. In special applications even greater dilutions with water are required. It is important that a clear homogeneous, single phase mixture result from the dilution of the resin to preclude fractional separation in mixing tanks and material transfer lines.

Additionally, fractional separation implies separation of the least soluble portion of that phenolic resin. This least soluble portion is also likely to be the highest molecular weight fraction and consequently the most viscous fraction. There is created by this fractional separation, then, not only the problem of proper spray atomization of the whole resin in homogeneous solution, but, more prominently, the proper atomization of this most viscous fraction which is no longer attenuated by a plasticizing water phase.

The foregoing defines the reasons for requiring ample water miscibility to preclude operating difficulties of two types: *a* production continuity and *b* product quality.

Thus, loss of water miscibility prior to the time of use by the consumer causes separation of binder from the diluted binder mix with consequent fouling of equipment and poor distribution of applied binder as a result of non-homogeneity of the binder mix. Quality loss in the bonded product (for example glass fibre insulation batts) resulting from poor distribution is reflected in color, bond strength, stickiness and occasionally fires due to close proximity of excessive amounts of binder particles while hot.

These problems are substantially overcome by the modification of high water-miscibility phenol-formaldehyde condensation products with boric acid as hereinbefore described.

What is claimed is:

1. An alkaline-catalyzed, water-soluble, heat-hardenable condensate of one mol phenol and between 1.1 and 3.0 mols formaldehyde reacted at a reaction pH between 8.4 and 11.5 in the presence of an inorganic alkaline catalyst which does not form water-insoluble products with boric acid to form a reaction product having a water-miscibility value not less than 500 per cent and neutralized with boric acid to a pH value between 7.0 and 8.0, said boric acid neutralized condensate having a water-miscibility value not less than 500 per cent.

2. An alkaline-catalyzed, water-soluble, heat-hardenable condensate of one mol phenol and at least 2.25 mols formaldehyde reacted at a pH value between 8.4 and 11.5 in the presence of an inorganic alkaline catalyst which does not form water-insoluble products with boric acid to form a water-soluble condensate, said condensate having a water-miscibility not less than 500 per cent and an average molecular weight between 225 and 300, and neutralized to a pH value between 7.0 and 8.0 with boric acid, said boric acid neutralized condensate having a water miscibility value of not less than 500 per cent.

3. A sodium hydroxide catalyzed, water-soluble, heat-hardenable condensate of one mol phenol and between 1.1 and 3.0 mols formaldehyde reacted at a pH between 8.4 and 11.5, said product containing boric acid in amount imparting a pH value between 7.0 and 8.0 and having a water-miscibility value not less than 500%.

4. Process which comprises reacting a molar quantity of phenol with between 1.1 and 3.0 mols formaldehyde at a pH between 8.4 and 11.5 in the presence of an inorganic alkaline catalyst which does not form water-insoluble products with boric acid to produce a liquid condensation product miscible with at least 10 parts of distilled water, and then inhibiting loss of said water miscibility on storage by incorporating in the water-miscible product boric acid in an amount to impart to the product a pH value between 7.0 and 8.0.

5. Process which comprises reacting a molar quantity of phenol with between 1.1 and 3.0 mols formaldehyde at a pH between 8.4 and 11.5 in the presence of a catalyst selected from the group consisting of sodium hydroxide and potassium hydroxide until a condensation product is obtained that is miscible with at least 10 volumes of distilled water, and then inhibiting loss of said water miscibility on storage by dispersing in the product an aqueous slurry of boric acid in amount imparting to the product a pH value between 7.0 and 8.0.

References Cited in the file of this patent

UNITED STATES PATENTS

| 1,678,107 | Deutsch | July 24, 1928 |
| 2,190,672 | Meharg | Feb. 20, 1940 |

OTHER REFERENCES

Robitschek: Phenolic Resins, pages 109–111, Iliffe and Sons, London, England, 1950.